United States Patent
Lo et al.

(10) Patent No.: US 11,226,605 B2
(45) Date of Patent: Jan. 18, 2022

(54) PROVISIONING OF CONTROL LAYER APPLICATIONS FOR USE IN INDUSTRIAL CONTROL ENVIRONMENTS

(71) Applicant: Siemens Aktiengesellschaft, Munich (DE)

(72) Inventors: George Lo, Langhorne, PA (US); Livio Dalloro, Plainsboro, NJ (US); Thomas Gruenewald, Somerset, NJ (US); Christian Winkler, Gräfelfing (DE); Peter Kob, Heroldsberg (DE); Andreas Scholz, Unterschleißheim (DE); Mina Azib, Princeton, NJ (US); Hermann Friedrich, Zorneding (DE); Ren-Yi Lo, Monmouth Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 183 days.

(21) Appl. No.: 15/541,546

(22) PCT Filed: Jan. 9, 2015

(86) PCT No.: PCT/US2015/010761
§ 371 (c)(1),
(2) Date: Jul. 5, 2017

(87) PCT Pub. No.: WO2016/111694
PCT Pub. Date: Jul. 14, 2016

(65) Prior Publication Data
US 2018/0011465 A1    Jan. 11, 2018

(51) Int. Cl.
*G05B 19/05*    (2006.01)
*G05B 19/042*    (2006.01)
(Continued)

(52) U.S. Cl.
CPC ........... *G05B 19/05* (2013.01); *G05B 19/042* (2013.01); *G05B 19/4188* (2013.01);
(Continued)

(58) Field of Classification Search
CPC .. G05B 19/042; G05B 19/05; G05B 19/4188; G05B 2219/14037; G05B 2219/23297;
(Continued)

(56) References Cited

U.S. PATENT DOCUMENTS

| | | | |
|---|---|---|---|
| 2003/0014387 A1 | 1/2003 | Kreidler et al. | |
| 2009/0156162 A1* | 6/2009 | Satou | H04L 12/1818 455/406 |

(Continued)

FOREIGN PATENT DOCUMENTS

| | | |
|---|---|---|
| CN | 1417961 A | 5/2003 |
| CN | 101175023 A | 5/2008 |

(Continued)

OTHER PUBLICATIONS

International Search Report dated Sep. 2, 2015; Application No. PCT/US2015/010761; Filing Date: Jan. 9, 2015; 11-pages.

(Continued)

*Primary Examiner* — Michael J Huntley (57) ABSTRACT

A control layer automation device comprises a processor, one or more control layer applications, a database, a wireless interface, a device memory. Each control layer application is configured to perform a discrete set of automation functions. The database comprises a plurality of operator device identifiers and the wireless interface allows the one or more control layer applications to communicate with a plurality of operator devices via the plurality of operator device identifiers. The device memory comprises the one or more control layer applications. The control layer application manager is (Continued)

configured to manage execution of the one or more control layer applications on the processor.

13 Claims, 7 Drawing Sheets

(51) Int. Cl.
| | | |
|---|---|---|
| *G05B 19/418* | (2006.01) | |
| *H04W 4/60* | (2018.01) | |
| *G05B 23/02* | (2006.01) | |
| *G06Q 20/08* | (2012.01) | |

(52) U.S. Cl.
CPC ..... *G05B 23/0213* (2013.01); *G05B 23/0289* (2013.01); *H04W 4/60* (2018.02); *G05B 2219/14037* (2013.01); *G05B 2219/23297* (2013.01); *G06Q 20/085* (2013.01); *Y02P 90/02* (2015.11); *Y02P 90/80* (2015.11)

(58) Field of Classification Search
CPC ............ G05B 23/0213; G05B 23/0289; G06Q 20/085; H04W 4/60; Y02P 90/02; Y02P 90/80
See application file for complete search history.

(56) References Cited

U.S. PATENT DOCUMENTS

| | | | | |
|---|---|---|---|---|
| 2010/0094981 | A1* | 4/2010 | Cordray | .................. H04L 41/20 709/222 |
| 2011/0078675 | A1* | 3/2011 | Van Camp | ................ G06F 8/65 717/170 |
| 2011/0190938 | A1* | 8/2011 | Ekelund | ............... G05B 19/409 700/264 |
| 2013/0212160 | A1* | 8/2013 | Lawson | ............. G05B 19/4185 709/203 |
| 2013/0345829 | A1* | 12/2013 | Garg | .................. G05B 19/0428 700/9 |
| 2014/0058537 | A1 | 2/2014 | Jost | |
| 2014/0100668 | A1 | 4/2014 | Jundt et al. | |
| 2015/0287318 | A1* | 10/2015 | Nair | ....................... G08C 17/02 340/5.52 |

FOREIGN PATENT DOCUMENTS

| | | |
|---|---|---|
| CN | 101436070 A | 5/2009 |
| CN | 101775448 A | 7/2010 |
| CN | 101175023 B | 12/2011 |
| CN | 102497573 A | 6/2012 |
| CN | 202758227 U | 2/2013 |
| CN | 204086978 U | 1/2015 |

OTHER PUBLICATIONS

Chinese Office Action dated Jan. 22, 2019; Application No. 201580072729.2; Filing Date: Jan. 9, 2015; 9 pages.

Chinese Office Action dated Jul. 12, 2019; Application No. 201580072729.2; 8 pages.

* cited by examiner

PROVISIONING OF CONTROL LAYER APPLICATIONS FOR USE IN INDUSTRIAL CONTROL ENVIRONMENTS

This application is a national phase filing under 35 U.S.C. § 371 of International Patent Application No. PCT/US2015/010761, filed Jan. 9, 2015, which is incorporated herein by reference in its entirety.

TECHNICAL FIELD

The present invention relates generally to systems, methods, and apparatuses for provisioning software applications ("apps") for use in industrial automation environments. The disclosed technology may be applied to, for example, enable the use of software apps on control layer devices such as programmable logic controller and field devices.

BACKGROUND

Control layer devices are specialized automation devices used in industrial environments. Two examples of control layer devices are a programmable logic controller (PLC) and a field device. A PLC configured to execute software which continuously gathers data on the state of input devices to control the state of output devices. A PLC typically includes three major components: a processor (which includes volatile memory), non-volatile memory comprising an application program, and one or more input/output (I/O) ports for connecting to other devices in the automation system. Field devices perform, for example, mechanical or electrical operations based on instructions from the PLC. Examples of field devices include valves, switches, sensors (e.g., temperature, pressure, and/or flow rate), and transmitters. The exact components included in a field device will depend upon its intended functionality.

One of the challenges of effectively operating and maintaining industrial automation systems is that these systems have traditionally been very inflexible. For example, it is difficult to modify the behavior and operation of control layer field devices once they have been installed and configured. The lack of flexibility in control layer devices generally, restricts the level of customization that the device owner can perform. For example, a device owner may purchase several control layer devices programmed to perform certain functionality. Over time, the device owner may wish to modify or extend that functionality, based on the needs of the owner's business, as well as other new or changing customer demands. With conventional systems, device specialists (e.g., engineers) must redesign the device software to perform the designed functionality. Moreover, it is challenging to diagnosis and address system error conditions at the control layer due to the lack of robust engineering tools provided on control layer devices.

SUMMARY

Embodiments of the present invention address and overcome one or more of the above shortcomings and drawbacks, by providing methods, systems, and apparatuses related to a control layer device configured to execute one or more discrete software applications, referred to herein as "control layer applications," which extend the functionality of the device. For example, control layer applications may be added or removed as desired by the device owner. In some embodiments, a marketplace server may be used to browse and download additional control layer applications for use on a respective control layer device. The technology described herein is particularly well-suited for, but not limited to, various industrial automation settings.

According to some embodiments, a control layer automation device comprises a processor, one or more control layer applications, a database, a wireless interface, a device memory. Each control layer application is configured to perform a discrete set of automation functions. The one or more control layer applications may include, for example, at least one interface application configured to present a graphical user interface comprising status information on an operator device. The database comprises a plurality of operator device identifiers and the wireless interface allows the one or more control layer applications to communicate with a plurality of operator devices via the plurality of operator device identifiers. The device memory comprises the one or more control layer applications. The control layer application manager is configured to manage execution of the one or more control layer applications on the processor.

Various enhancements, modifications, and/or adjustments may be made to the aforementioned control layer automation device in different embodiments. For example, in one embodiment, the control layer application manager is further configured to: receive a request for functionality that is not available in the control layer applications; identify a new control layer application providing the functionality; and retrieve the new control layer application from the marketplace server via the marketplace client. In some embodiments, the control layer application manager is configured to autonomously identify and retrieve the new control layer application.

Some embodiments of the aforementioned control layer automation device include a plurality of isolated computing environments, with each isolated computing environment providing runtime computing resources for one of the control layer applications. In one embodiment, each of the plurality of isolated computing environments comprises a discrete portion of the device memory. In another embodiment, each of the isolated computing environments restricts network access for a respective control layer application to communication with the plurality of operator devices.

The aforementioned control layer automation device may also include additional components in different embodiments. For example, in some embodiments, the device further comprises a marketplace client configured to communicate with a marketplace server to download the one or more control layer applications. In another embodiment, the device include a real-time scheduler which is configured to schedule processing of the control layer applications to facilitate real-time or near real-time execution on the processor. In another embodiment, the control layer automation device includes a peer device interface which is configured to transmit first data associated with the one or more control layer applications to a first external control layer automation device, and receive second data associated with one or more external control layer applications from a second external control layer automation device.

According to other embodiments described in the present application, a method for managing control layer applications includes a control layer automation device executing a plurality of control layer applications, wherein each control layer application is configured to perform a discrete set of automation functions. The control layer automation device receives a notification event from a first control layer application included in the plurality of control layer applications and identifies an operator device associated with the notification event. The control layer automation device generates a message based on the notification event which is then transmitted to the operator device.

Various enhancements, modifications, and/or adjustments may be made to the aforementioned method for managing control layer applications. For example, in one embodiment, the method further includes the control layer automation device receiving a request to modify one or more device settings associated with the first control layer application and modifying the device settings based on the request. In other embodiments, the control layer automation device maintains each isolated computing environment providing distinct runtime computing resources, wherein each of the plurality of control layer applications is executed in a discrete isolated computing environment included in the plurality of isolated computing environments. The isolated computing environments may comprise, for example, a discrete portion of device memory associated with the control layer automation device. In one embodiment, each of the isolated computing environments restricts network access for a respective control layer application to communication with external devices.

According to other embodiments described in the present application, a method for managing control layer applications includes a control layer automation device maintaining a plurality of isolated computing environments which distinct runtime computing resources and executing control layer applications in the isolated computing environments, with each control layer application configured to perform a discrete set of automation functions. The control layer automation device schedules processing of the plurality of control layer applications to facilitate real-time or near real-time execution on a processor associated with the control layer automation device. In some embodiments of the aforementioned method, the control layer automation device modifies one or more device settings associated with a first control layer application included in the plurality of control layer applications based on a received request. In some embodiments, the device receives a request (e.g., from an operator device external to the control layer automation device) for functionality that is not available in the plurality of control layer applications. The device identifies a new control layer application providing the functionality which may then be retrieved, for example, from a marketplace server. In one embodiment, the control layer automation device facilitates a transaction with the marketplace server for payment of the new control layer application.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to software applications that are downloaded to control layer automation devices to perform a specific set of functions not typically found in such devices. More specifically, these applications, referred to herein as "control layer applications" are self-contained programs or pieces of software designed to perform functions which supplement, extend, or replace the functionality currently available in automation systems. The technology described herein may be applied in a variety of settings where control systems are used including, without limitation, industrial production environments.

Figure 1A:
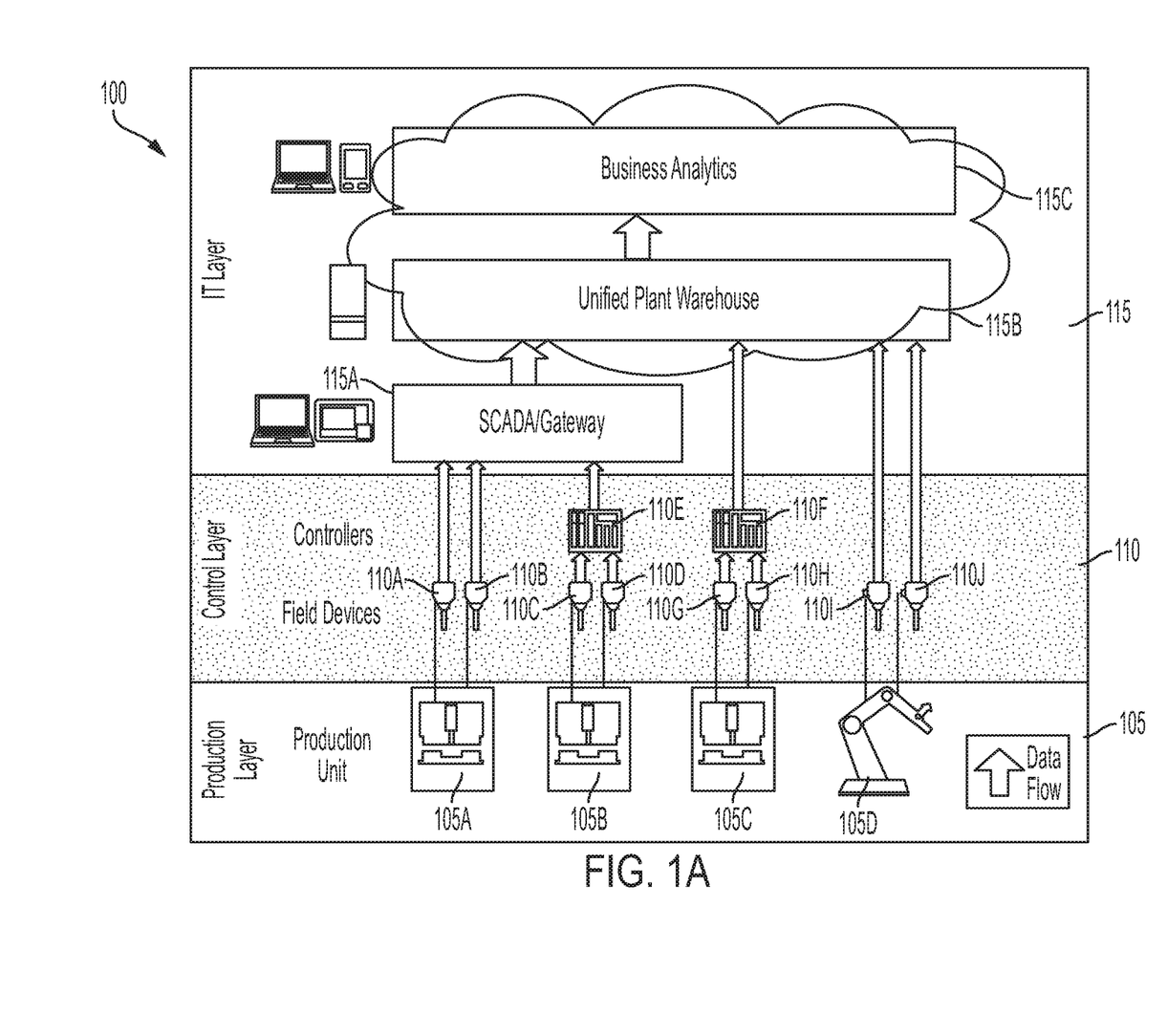
FIG. 1A provides an illustration of how control layer applications may be integrated into an automation system, according to some embodiments of the present invention.

FIG. 1A provides an illustration of how control layer applications may be integrated into an automation system 100, according to some embodiments of the present invention. This example conceptually partitions an industrial environment into a Production Layer 105, a Control Layer 110, and an IT Layer 115. In conventional systems, most data handling functions, as well as other functions in Manufacturing Execution System (MES) such as analytics, workflow and asset management, are performed at the IT Layer 115. However, using the techniques described herein, control layer applications are installed at control layer devices to push many of these data handling functions down to the Control Layer 110. In the example of FIG. 1, the control layer devices include two Controllers 110E and 110F and eight Field Devices 110A, 110B, 110C, 110D, 110G, 110H, 110I, and 110J. As control layer devices, these controllers and field devices may be used to perform discrete automation functions (e.g., engineering) directly on the devices, thereby increasing their respective machine and process efficiency.

Briefly, data received from the Production Units (e.g., Units 105A, 105B, 105C, and 105D) is transferred by the Control Layer Devices to the IT Layer 115. The IT Layer 115 includes systems which perform various post-processing and storage tasks. The example of FIG. 1 includes a Supervisory Control and Data Acquisition (SCADA) Server (or Gateway) Component 115A. This Component 115A allows an operator to remotely monitor and control the devices at the Control Layer 110 and Production Layer 105. Additionally, the SCADA Server Component 115A collects data from the lower layers 105, 110 and processes the information to make it available to the Unified Plant Knowledge Warehouse 115B. The Unified Plant Knowledge Warehouse 115B provides further processing and storage of the data received from the lower layers 105, 110. Various functionality may be provided by the Unified Plant Knowledge Warehouse 115B. For example, in some embodiments, the Unified Plant Knowledge Warehouse 115B includes functionality for supporting Business Analytics 115C based on the data generated by the lower layers 105, 110.

One or more of the devices at the Control Layer 110 are configured to execute control layer applications. Various functions can be performed by these applications. Example functions that may be performed by control layer applications include tasks related to one or more of product engineering, production engineering, commissioning, sensing/acting, control, monitoring, optimization, collaboration, diagnostics, and business intelligence. For example, in some embodiments, each control layer device includes a control layer Application providing onboard engineering tools which allow a user to do basic configuration and engineering without the need of workstation engineering program. Additionally, because these applications are operating at the control layer, they may take advantage of data not typically made available at higher layers. For example, in some embodiments, the control layer applications may enrich data using additional context dimensions such as control knowledge, environmental conditions, and service incidences. This allows insights to be made from data analytics with higher confidence and quality. The additional context dimensions may also yield new insights. In some embodiments, the control layer applications each use semantic data representation languages and/or standards for data in automation systems in order to integrate with the other components of the system 100 with minimal effort. In some embodiments, the control layer applications may also provide distributed data sharing both within the system 100 and externally, integrating with Big Data infrastructures.

Figure 1B:
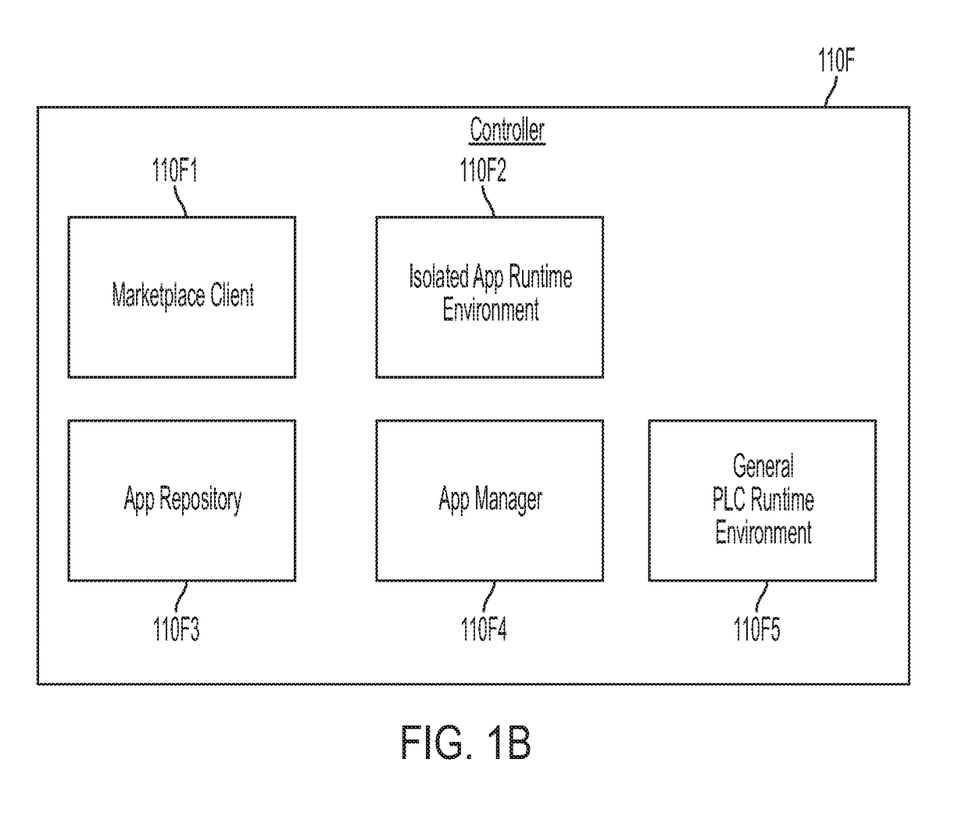
FIG. 1B provides a conceptual view of how Controller may be designed to support control layer applications, according to some embodiments of the present invention.

FIG. 1B provides a conceptual view of how Controller 110F may be designed to support control layer applications, according to some embodiments of the present invention. It should be noted that this is merely an example and the general design can apply to other devices in the automation system 100 including Controller 110E.

A Marketplace Component 110F1 is configured to download control layer applications from an external Marketplace Server which hosts control layer applications. The downloads may be initiated by a user such as a maintenance engineer. For example, the Marketplace Component 110F1 may provide a graphical user interface (GUI) which allows the user to view and download control layer applications available on the server. Additionally, in some embodiments, downloads are performed automatically by the Controller 110F. Thus, if the Controller 110F determines that it requires a particular control layer application to perform an operation, it can download it autonomously using the Marketplace Component 110F1. The downloaded applications are stored in an App Repository 110F3 (e.g., a designated portion of the Controller's 110F's non-volatile memory).

Continuing with reference to FIG. 1A, the Controller 110F includes two runtime environments: an Isolated App Runtime Environment 110F2 and a General PLC Runtime Environment 110F5. Control layer applications execute in the Isolated App Runtime Environment 110F2, sandboxed from the operation of the General PLC Runtime Environment. The Isolated App Runtime Environment 110F2 provides a discrete set of runtime computing resources for each control layer application executing on the Controller 110F. For example, the Controller 110F includes volatile memory (not shown in FIG. 1A) which is updated in each processing/scan cycle based on data associated with the production devices (e.g., the inputs and outputs of connected I/Os). In some embodiments, the Isolated App Runtime Environment 110F2 includes a discrete portion of this volatile memory, dedicated to a particular control layer application. This concept may also be extended to the non-volatile memory system of the PLC, allocating each control layer application a particular portion of the memory space. Additionally, the Isolated App Runtime Environment 110F2 may restrict network access for a respective control layer application to communication with one or more specific operator devices. Thus, control layer applications may be restricted from communicating with external devices in unexpected ways to avoid problems such as heavy communication load or cyber security issues.

The App Manager 110F4 is configured to manage execution of the control layer applications on the Controller 110F. In some embodiments, the App Manager 110F4 includes a real-time scheduler configured to schedule processing of the control layer applications to facilitate real-time or near real-time execution on the Controller's 110F processor. The App Manager 110F4 may also record information such as events associated with the control layer applications executing on the Controller 110F. This information may be used, for example, by an engineer to provide an initial analysis of a problem with the Controller 110F. Additionally, the App Manager 110F4 may enable a user to connect to the Controller 110F indirectly or directly using a wireless network connection (e.g., via a Wi-Fi or Bluetooth). Using this connection, the user's device can retrieve and display a graphical user interface (GUI) which enables the user to view state information and modify configuration settings associated with the Controller 110F or the control layer applications used by the Controller 110F. In some embodiments, the GUI is delivered in a well-supported format (e.g., HTML) allowing for cross-device compatibility.

Figure 2:
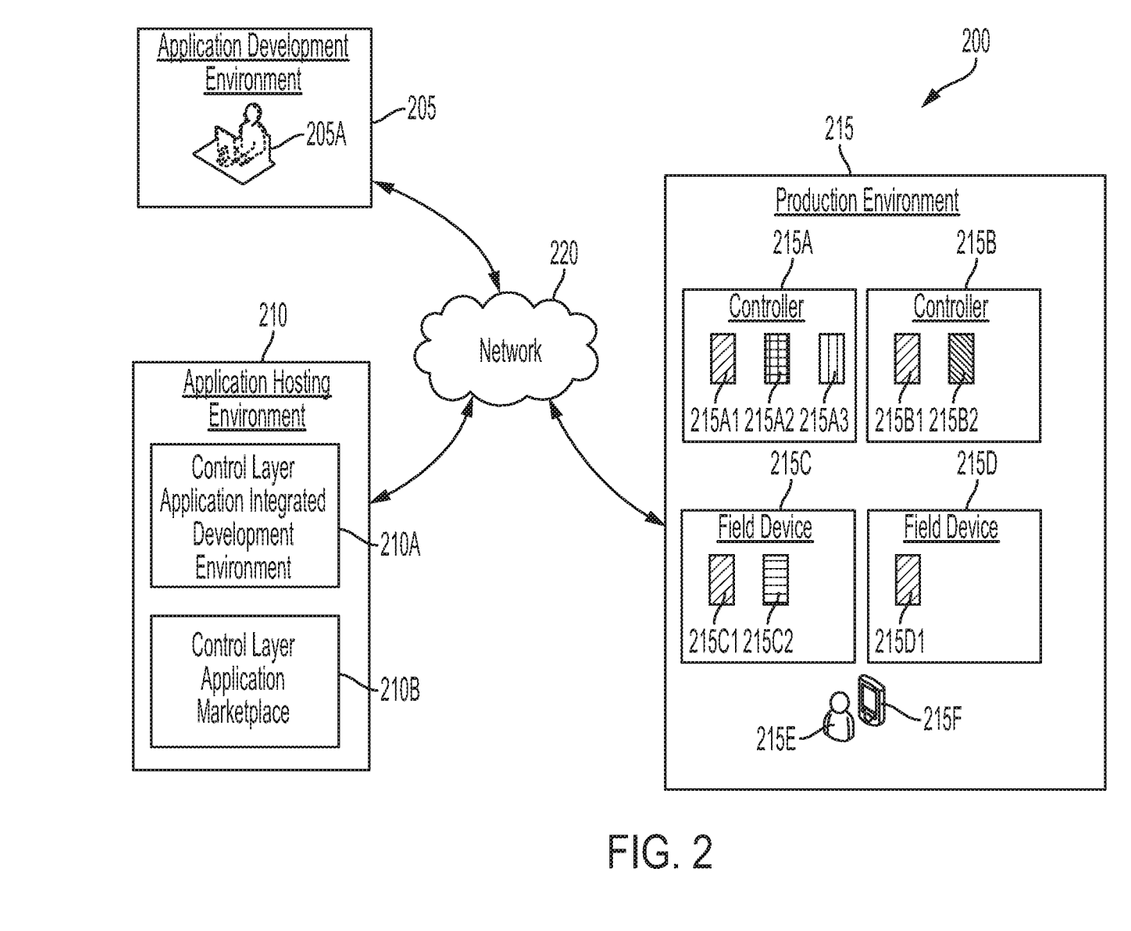
FIG. 2 provides an overview of how control layer applications may be developed and integrated into a Production Environment, according to some embodiments of the present invention.

FIG. 2 provides an overview 200 of how control layer applications may be developed and integrated into a Production Environment 215, according to some embodiments of the present invention. The example illustrated in FIG. 2 is divided into three locations: an Application Development Environment 205, an Application Hosting Environment 210, and a Production Environment 215. These three locations 205, 210, 215 are connected via Network 220. The Network 220 may be implemented using a variety of hardware platforms and communication tools. For example, the Network 220 may be implemented using the IEEE 802.3 (Ethernet) or IEEE 802.11 (wireless) networking technologies, either separately or in combination. In some embodiments, the Network 220 is implemented using the Internet. In other embodiments, for example where security may be a concern, the Network 220 may be a corporate intranet.

Control layer applications are created by application developers in development environments such as Application Development Environment 205 in FIG. 1. One of the benefits of control layer applications is that they allow a range of programmers to create software for use in the Production Environment 215, from well-established companies that have a long history of developing automation software to independent developers who are developing their first automation projects. The Application Developer 205A operating within the Application Development Environment 205 can develop applications for the Production Environment 215 in variety of ways. For example, in some embodiments, control layer applications may be developed using conventional standards-based programming languages (e.g., C, C++, Java, etc.). In other embodiments specialized techniques such as relay-derived ladder logic may be used. Additionally, in some embodiments, the Application Developer 205A can use a Control Layer Application Integrated Development Environment (IDE) 210A, described in greater detail below.

The Application Hosting Environment 210 provides functionality for creating, managing, and hosting control layer applications. In the example of FIG. 2, the Application Hosting Environment 210 includes two components: a Control Layer Application IDE 210A and a Control Layer Application Marketplace 210B. The Application Hosting Environment 210 is connected to the Network 220 to provide a centralize resource of control layer applications for developers, end-users, maintenance engineers, device operators, and other persons interacting with various production environments.

The Control Layer Application IDE 210A provides functionality for creating and maintaining control layer applications. This IDE 210A may provide, for example, tools, documentation, and source code which allow the Application Developer 205A to quickly develop applications for the Production Environment 215. In some embodiments, the IDE 210A may also include functionality for testing and debugging the application code. One example of a Control Layer Application IDE 210A is described in greater detail below with reference to FIG. 3. In some embodiments, the Control Layer Application IDE 210A is implemented using a cloud-based model where developers interface with a web-based server hosting the IDE 210A. In other embodiments, a portion or all of the IDE is downloaded and installed on the computer of the Application Developer 205A, thus allowing for local development of control layer applications.

The Control Layer Application Marketplace 210B makes control layer applications available to users (e.g., via download). In some embodiments, the Control Layer Application Marketplace 210B includes a web-based store interface where users can browse through different categories of control layer applications, view descriptive information about each control layer applications, and acquire control layer applications. The Control Layer Application Marketplace 210B may also provide information such as reviews or ratings with each control layer application. In one embodiment, the Control Layer Application Marketplace 210B also handles any financial transactions associated with acquiring control layer application. For example, the Application Developer 205A may set a price for each control layer application uploaded to the Control Layer Application Marketplace 210B. Upon a purchase of one of the Application Developer's 205 applications, the Control Layer Application Marketplace 210B will send the funds to the Application Developer 205A. A portion of the funds representing commission fees due to the Control Layer Application Marketplace 210B may be automatically deducted by Control Layer Application Marketplace 210B prior to transmission to the Application Developer. In some embodiments, the Control Layer Application Marketplace 210B may include security related functionality. For example, in one embodiment, the Control Layer Application Marketplace 210B notify an end user (e.g., operator or maintenance engineer) that a control layer application was found to include malicious software or critical errors. The end user can later safely disable or remove the application from the operational standpoint.

At the Production Environment 215, control layer applications are installed and used on control layer devices. In the example of FIG. 2, three such devices are shown: two Controllers 215A and 215B, and two Field Devices 215C and 215D. Other devices that may be present in the Production Environment 215 (e.g., production and IT layer devices) have been omitted from FIG. 2. Each Control Layer Device 215A, 215B, 215C, 215D includes one or more control layer applications. Some particular control layer applications may be installed on all devices in the Production Environment 215. For example, in FIG. 2, Control Layer Applications 215A1, 215B1, 215C1, and 215D1 are all shown with a similar pattern to illustrate that they provide similar functionality. Such an implementation strategy may be employed, for example, for monitoring or analytics applications that are installed across the Production Environment 215.

Each device in the Production Environment 215 may have its own unique set of applications. For example, Controller 215A includes two applications 215A2 and 215A3 that are not installed on Controller 215B. Similarly, Controller 215B includes an application 215B2 that is not installed on controller 215A. Thus, each device may be configured uniquely based on the desired functionality of the system. As an another example, Field Device 215C includes a Control Layer Application 215C2 that is not installed on Field Device 215D. The Control Layer Application 215C2 may provide functionality which may be incompatible. For example, if Field Device 215C is part of a beverage flavoring device system, the Control Layer Application 215C2 may provide functionality related to developing a specific flavor combination. If the other Field Device 215D is part of a different type of device system (e.g., a mixer), the functionality of a flavoring application may be meaningless. Thus, this Control Layer Application 215C2 can be omitted from the Field Device 215D.

In some embodiments, the control layer applications installed on the Control Layer Devices 215A, 215B, 215C, and 215D allow an onsite maintenance engineer 215E to perform functions such as administration, maintenance, and/ or monitoring of the Control Layer Devices 215A, 215B, 215C, and 215D. For example, in some embodiments, the Control Layer Devices 215A, 215B, 215C, and 215D each include networking functionality which allows the devices to communicate (directly or indirectly) with a wireless device 215F (e.g., tablet computer) operated by the onsite maintenance engineer 215E. Thus, the onsite maintenance engineer 215E can directly interact with and modify the control layer devices 215A, 215B, 215C, and 215D within the Production Environment 215. To continue with the example of a beverage flavoring system, the onsite maintenance engineer 215E may use the wireless device 215F to modify the ratios of ingredients being used for each beverage. Alternatively, the onsite maintenance engineer 215E may install an entirely new application to provide new flavoring combinations not available in the system. In some embodiments, the onsite maintenance engineer 215E can perform many, if not all, configuration and maintenance operations with the devices 215A, 215B, 215C, and 215D directly with the wireless device 215F, even if the onsite maintenance engineer 215E is in close proximity to the devices 215A, 215B, 215C, and 215D. Moreover, in some embodiments, engineers can even perform such operations offsite over networks such as the Internet or corporate intranets. This may be contrasted with conventional systems where modification of system behavior requires the engineer to diagnose the problem onsite and then go offsite to develop the source code for the solution which must then be brought back to the site for installation. Thus, the control layer applications installed on the Control Layer Devices 215A, 215B, 215C, and 215D increase the engineer's 215E overall efficiency and allows the Production Environment 215 as a whole to be more productive.

For the examples presented in FIG. 2, it should be noted that, in larger plant, one or more of the tasks described above with reference to the onsite maintenance engineer 215E may be performed instead by an operator using the techniques described herein. The role of an operator is to ensure the production process results in desired product, while the role of a maintenance engineer is only to make sure the plant equipment are working properly. The operator is analogous to the driver of a car, while the maintenance engineer is analogous to the workshop mechanic/technician.

Figure 3:
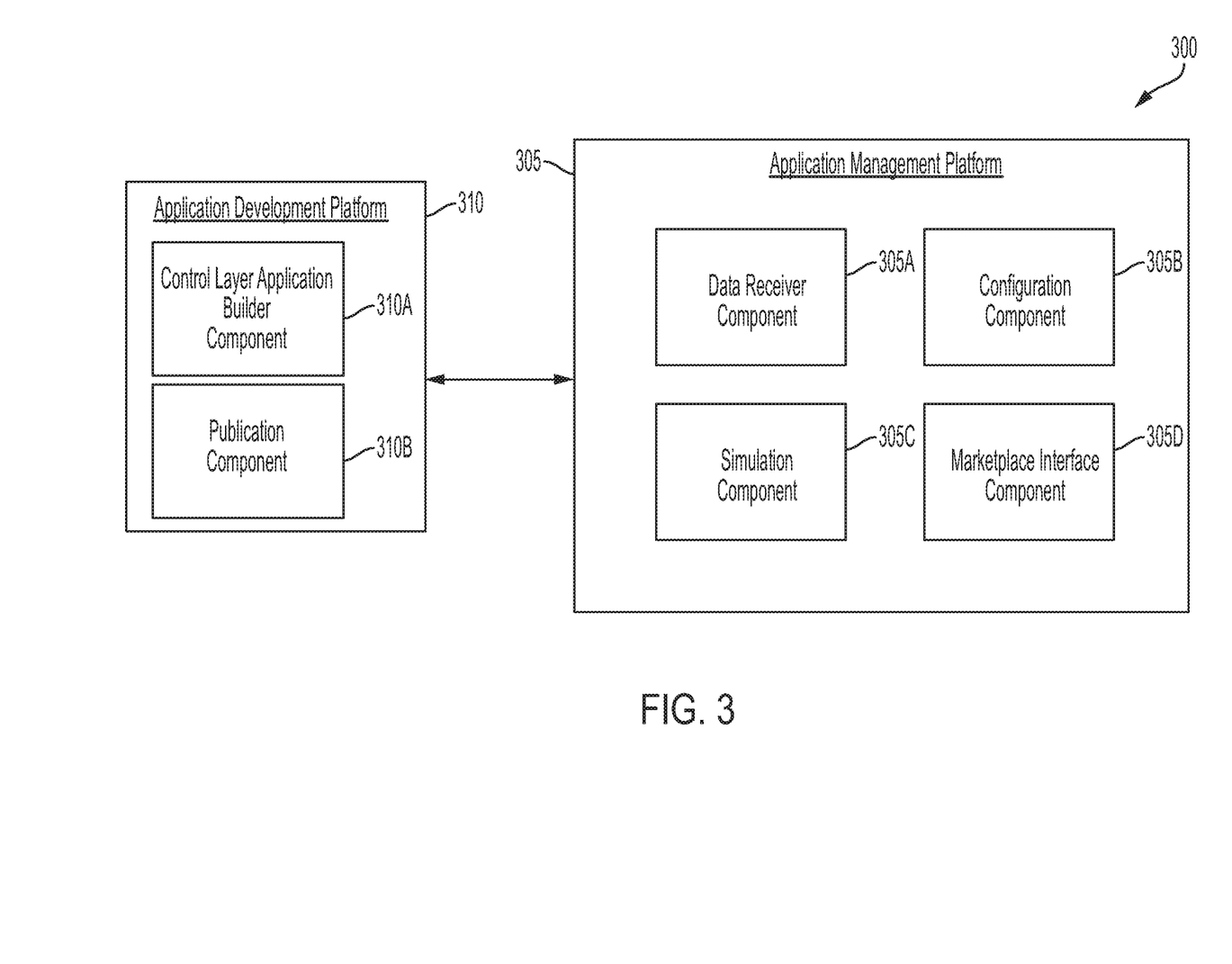
FIG. 3 provides an example of a control layer application integrated development environment (IDE), according to some embodiments of the present invention.

FIG. 3 provides an example of a Control Layer Application IDE 300, according to some embodiments of the present invention. This example is divided into two elements: an Application Management Platform 305 and an Application Development Platform 310. It should be noted that the portioning and naming of various functional items in this example is merely for illustration. For example, in some embodiments, the various elements may be combined or separated into different elements to provide alternate designs for the Control Layer Application IDE 300.

The Application Management Platform 305 performs tasks related to the creation and publication of new control layer applications, as well as the configuration and management of existing control layer applications. In the example of FIG. 3, the Application Management Platform 305, a Data Receiver Component 305A which handles activities related to receiving data from external components such as, for example, the Application Development Platform 310. In some embodiments, the Data Receiver Component 305A comprises software with a publicly defined application programming interface (API) allowing direct function calls into the Application Management Platform 305. In other embodiments, the Data Receiver Component 305A may provide a simple interface for uploading a control layer application to the Application Management Platform 305. For example, in one embodiment, the Data Receiver Component 305A provides a web page with an input box for selecting and uploading a control layer application from a remote machine.

The Application Management Platform 305 is operably coupled to an Application Development Platform 310 which includes tools for creating control layer applications. In some embodiments this Platform is implemented as a standalone executable file which developers can install and utilize on their computers. In other embodiments, the Platform 310 includes a set of libraries that may be downloaded and utilized by applications developers in other development environments known in the art such as, for example, IDEs released from the Eclipse Foundation. In still other embodiments, the Application Development Platform 310 may be entirely cloud-based, operating on a server remote from the application developer and accessible through a web browser interface or other web-based tool.

This Application Development Platform 310 includes a Control Layer Application Builder Component 310A. This Component 310A may include, for example, a source code editor, tools for automating building of applications, and a debugger. The Application Development Platform 310 also includes a Publication Component 310B which allows publication of an application on the Application Management Platform 305. In some embodiments, the Publication Component 310B simply handles communication of a completed application to the Application Management Platform 305. In other embodiments, the Publication Component 310B may provide additional functionality such as formatting, testing, verifying, and/or validating a control layer application. For example, as explained in greater detail below, the Application Management Platform 305 may include functionality for testing the behavior of a control layer application in a simulated environment. Thus, in some embodiments, the Publication Component 310B may handle functionality such as pre-processing the application and creating any inputs required for the simulation. Also, the Publication Component 310B may receive and process the results of a simulation for display, for example, via the Control Layer Application Builder Component 310A.

Once uploaded to the Application Management Platform 305, the control layer application may be tested in a simulated automation environment by Simulation Component 305C. For example, in some embodiments, the Simulation Component 305C provides a graphical simulation environment where logical and physical components reside in a three-dimensional graphical workspace and can be edited, modified, and executed in an ad hoc manner. The Simulation Component may automatically create components based on the control layer application itself or, alternatively, an application developer can interact with the Simulation Component 305C during the development process to create and test various configurations of components interactively. Once the developer is satisfied with the behavior of the simulation, the Simulation Component 305C may provide the developer with the option of creating a Control Layer Software Application based on the simulation. Thus, in this may, the Simulation Component 305C may be viewed as an extension of the tools offered in the Control Layer Application Builder Component 310A to program control layer applications.

Once a control layer application is ready for execution in a production environment, a Marketplace Interface Component 305D may be used to perform any pre-processing required by the marketplace and finalize the process of uploading the code of the control layer application to the server hosting the marketplace. Examples of pre-processing that may be performed by the Marketplace Interface Component 305D include virus checks, error checking, validation across a particular set of marketplace requirements, and generation of descriptive information about the control layer application. A Configuration Component 305B may be used to configure existing control layer applications that have been uploaded to the marketplace servers. For example, an application developer may use the Application Development Platform to push updates or settings changes to existing control layer applications via the Configuration Component 305B.

Figure 4:
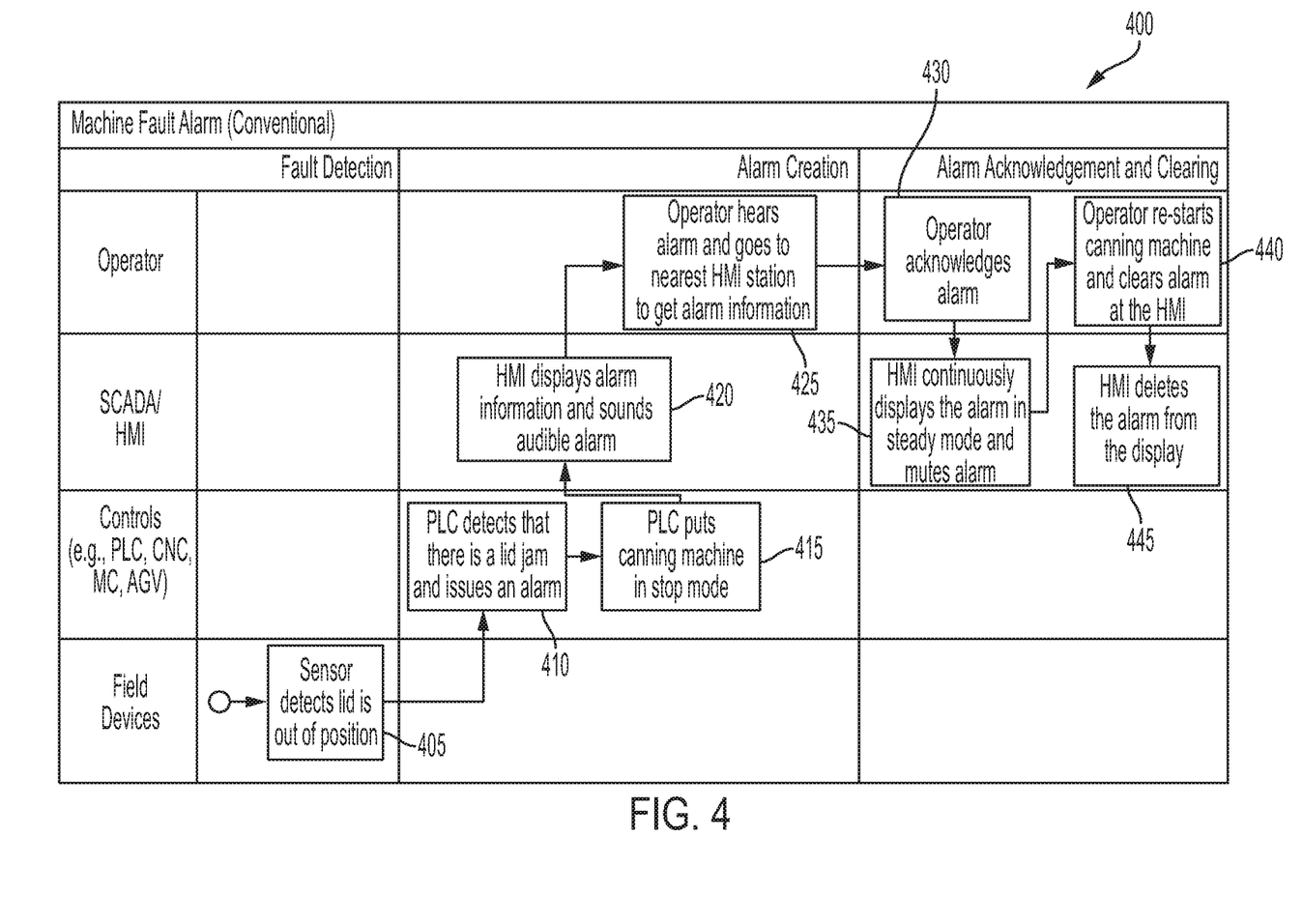
FIG. 4 shows an example process of responding to a canning machine fault alarm using a conventional automation system that does not utilize control layer applications.
Figure 5:
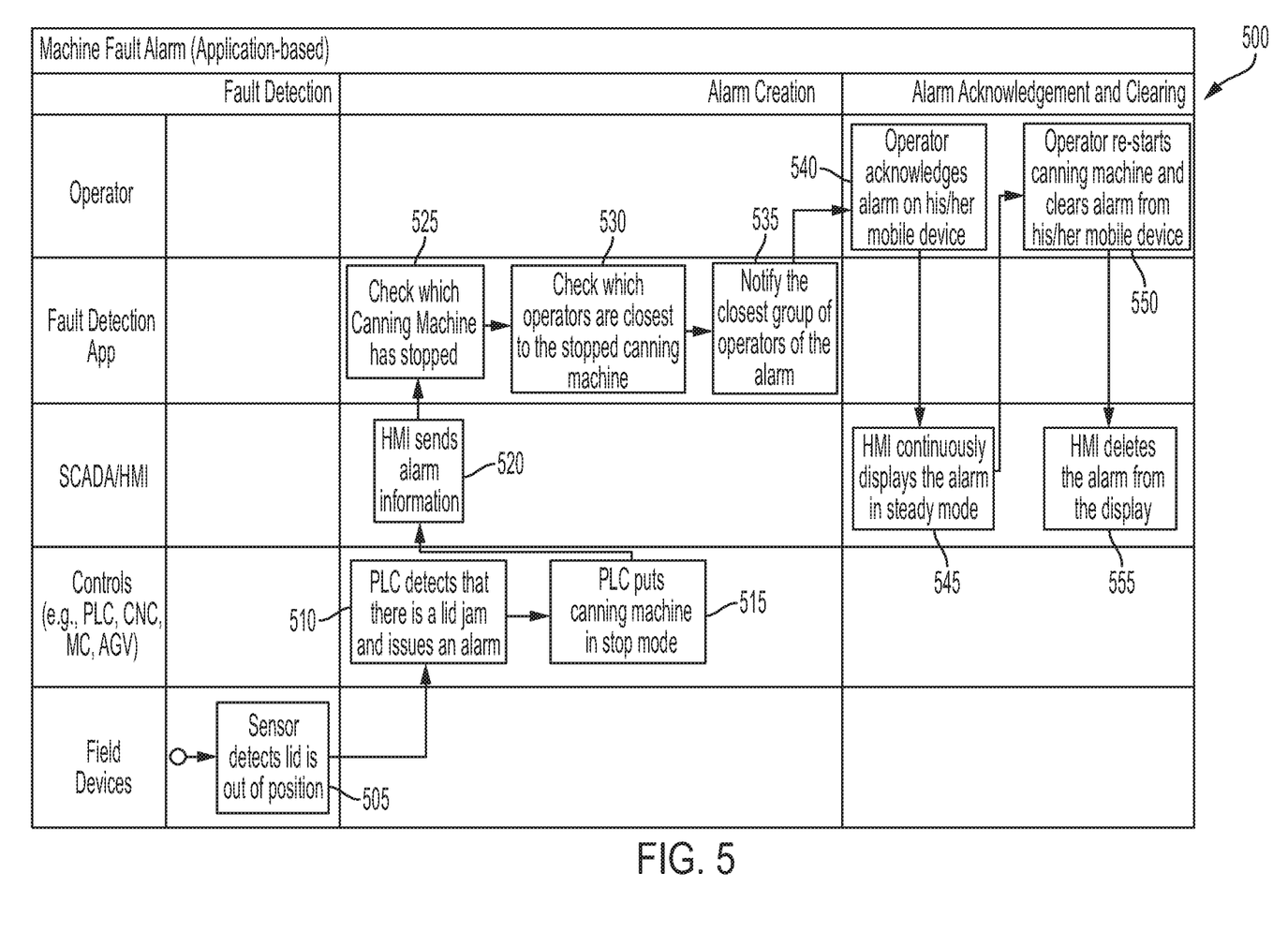
FIG. 5 shows an example process of responding to a canning machine fault alarm using a system which includes control layer applications, according to some embodiments of the present invention.

FIGS. 4 and 5 provide an example scenario which illustrates some of the benefits of utilizing control layer applications in industrial settings. FIG. 4 shows an example process 400 of responding to a canning machine fault alarm using a conventional automation system that does not utilize control layer applications. At 405, a field device sensor detects that the lid is out of position. Next, at 410, the PLC associated with the field device sensor detects that there is a lid jam and issues and alarm. At 415, the PLC puts the canning machine in a "stop" mode, thereby stopping all operations. Then, at 420, the Human-Machine Interface (HMI) units in the system display alarm information in a graphical user display and sounds an audible alarm. Hearing the alarm, at 425, the operator goes to the nearest HMI station to get alarm information. At 430, the operator acknowledges the alarm which, at 435, causes the HMI units to mute the alarm while continually displaying it in steady mode. Next, at 440, the operator re-starts canning machine and clears alarm at the HMI. Then, at 445, the HMI deletes the alarm from the display and normal operations can continue. A couple things are notable about this process 400.

For example, the operator is directly involved at the alarm creation stage because the operator must explicitly acknowledge the alarm. Also, the operator must travel to a HMI unit. Depending on the distance of the operator from the HMI unit, this could take several minutes, during which the rest of the system may be in an unsafe state. Moreover, note all HMI units issue the audible and visual alarm in this scenario. Thus, operations of the entire production environment could be disturbed until the error condition is addressed.

FIG. 5 shows an example process 500 of responding to a canning machine fault alarm using a system which includes control layer applications, according to some embodiments of the present invention. The first three steps of the process 500 are similar to the first three steps shown in FIG. 4. Thus, at 505 the field device sensor detects the lid as being out of position. Next, at 510, the corresponding PLC detects that there is a lid jam and issues an alarm. Then, at 515, the PLC puts the canning machine into stop mode.

Unlike the process 400 illustrated in FIG. 4, the process 500 shown in FIG. 5 contains a control layer application which is programmed with fault detection functionality (referred to as "Fault Detection App" in FIG. 5). This control layer application may operate, for example, on the PLC associated with the field device sensor. At 520, an HMI unit sends alarm information to the control layer application. Next, at 525 the control layer application determines information regarding which canning machine has stopped, including the machine's physical location. Based on this information, at 530 the control layer application determines which operators are closest to the stopped machine and, at 535, the control layer application notifies these operators of the alarm. In this example, notification is performed via the corresponding operator's mobile device. For example, in some embodiments, the operator utilizes a mobile device having applications installed therein which communicate with control layer application wirelessly (e.g., via Bluetooth or Wi-Fi networks). Upon receipt of a notification, the operator's device may display a visual alert and/or produce an audible alarm to bring the notification to the operator's attention. In other embodiments, other communication technologies may be used for the control layer application. For example, the control layer application may be given the operator's phone number and send a text message alert to the operator with alarm information. Thus, the operator may not need to install any additional software on his or her device.

Continuing with reference to FIG. 5, at 540 the operator acknowledges the alarm on his or her mobile device while, at the 545, the HMI unit(s) continuously display the alarm in steady mode. Next, at 550, the operator re-starts the canning machine and clears the alarm from the mobile device. Various techniques may be used for acknowledging and clearing the alarm on the device. For example, where a custom application is used, the operator may perform a touch-based operation (e.g., tap, swipe, etc.) over the alert. In turn, this may cause the custom application to send a message to the HMI units. Alternatively, where a text message-based notification system is employed, the operator may acknowledge or clear the alarm by responding to the text message, possibly with a particular keyword (e.g., "Ack" or "Clear"). At 555, once the HMI unit receives message from the operator clearing the alarm, the unit deletes the alarm from the display.

Figure 6:
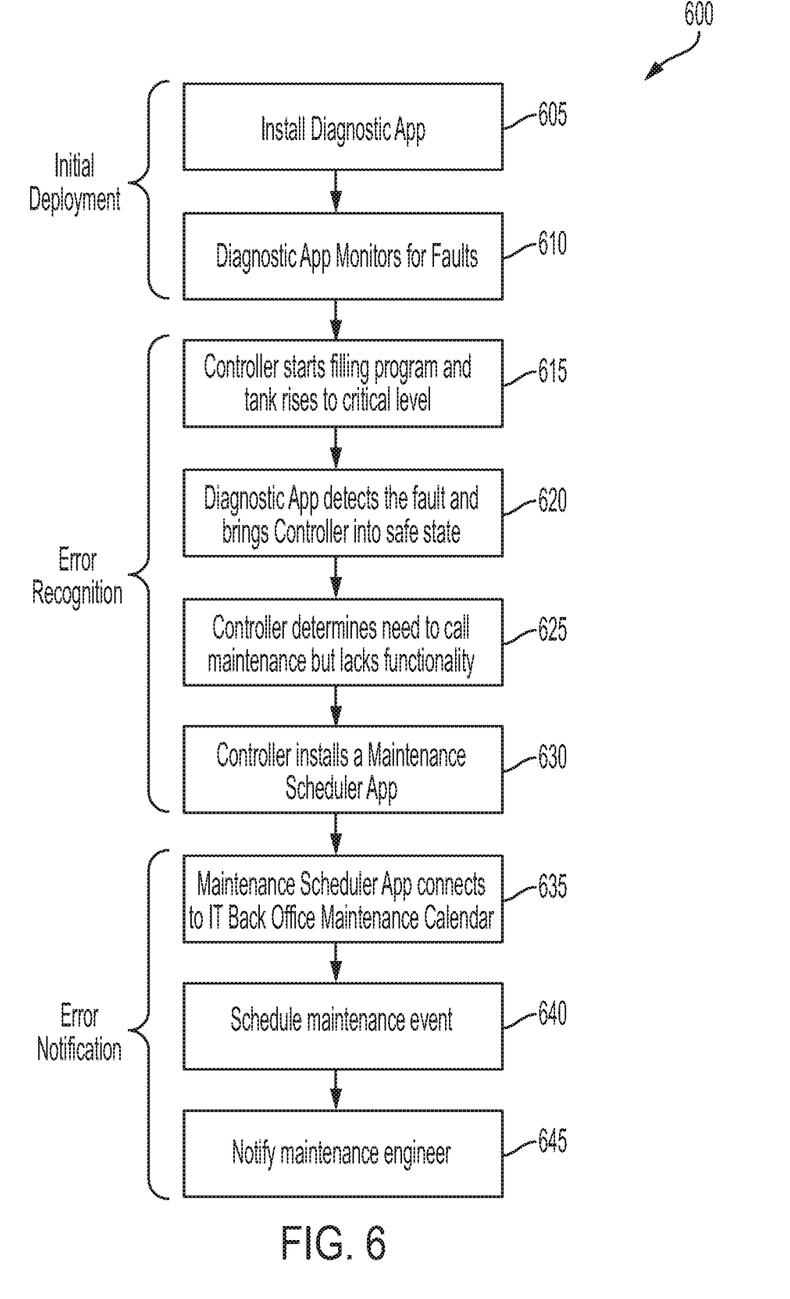
FIG. 6 provides an example process which illustrates the use of control layer applications, according to some embodiments of the present invention.

FIG. 6 provides an example process 600 which illustrates the use of control layer applications, according to some embodiments of the present invention. For illustration, this scenario considers an automation environment comprising a controller which controls a tank with a fill valve, a drain valve, and two sensors for the upper and lower tank limit, respectively. At 605, initial app deployment on the controller is performed to install a diagnostic control layer application (referred to herein as a "Diagnostic App"). This deployment may be performed, for example, during the first power-on. At 610, the Diagnostic App monitors the operation of the tank for faults.

Next, at 615, the controller starts a fill program and the tank rises to a critical level. At 620, the Diagnostic App detects the fault and brings the controller into a safe state. Next, at 625, the controller determines that a maintenance engineer needs to be notified, but it lacks the functionality to do so. Thus, at 630, the controller uses its marketplace client component to contact a marketplace server to download a control layer application for performing maintenance scheduling (a "Maintenance Scheduler App"), which is then installed. In other embodiments, not described in FIG. 6, rather than scheduling maintenance the controller may be configured to directly contact the maintenance engineer.

Continuing with reference to FIG. 6, with the Maintenance Scheduler App installed, at 630 the Maintenance Scheduler App connects to the IT Back Office Maintenance Calendar (e.g., Manufacturing Execution Systems, Enterprise Resource Planning). Next, at 635, a maintenance event is scheduled based on factors such as, for example, criticality, production schedules and availability. Then, at 640, the maintenance engineer is notified. The maintenance engineer can then perform error correction by connecting to the controller and opening the controller's app manager (see FIG. 1A) to check the recent events. Depending on the events that are displayed, the engineer may request that the controller's marketplace client download an onboard engineering control layer application (an "Onboard Engineering App") to detect and correct the issue. Finally, the maintenance engineer may restart the system with the Onboard Engineering App.

The processors described herein as used by control layer devices may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Various devices described herein including, without limitation to the control layer devices and related computing infrastructure, may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. A programmable logic controller operating in an automation system, the programmable logic controller comprising:
    a processor; and
    a device memory comprising:
        an app repository for storing one or more control layer applications, each control layer application configured to perform a discrete set of automation functions;
        an isolated app runtime environment configured to execute the control layer applications, wherein the isolated app runtime environment is sandboxed from a general programmable logic controller runtime environment;
        a database comprising a plurality of operator device identifiers;
        a wireless interface allowing the one or more control layer applications to communicate with a plurality of operator devices via the plurality of operator device identifiers;
        a marketplace client configured to communicate with a marketplace server to download the one or more control layer applications; and
        a control layer application manager configured to:
            manage execution of the one or more control layer applications on the processor,
            in response to a detected fault, autonomously identify a needed functionality that is not available in the one or more control layer applications, the functionality including at least one of administration, maintenance, or monitoring by the programmable logic controller, and
            autonomously identify and retrieve a new control layer application from the marketplace server via the marketplace client that provides the needed functionality.

2. The programmable logic controller device of claim 1, wherein the control layer application manager is further configured to:
    receive, from an operator device, a request for functionality that is not available in the one or more control layer applications;
    retrieve the new control layer application from the marketplace server via the marketplace client in response to the received request.

3. The programmable logic controller of claim 1, wherein the one or more control layer applications comprise at least one interface application configured to present a graphical user interface comprising status information on an operator device.

4. The programmable logic controller of claim 1, wherein the isolated app runtime environment provides a discrete set of runtime computing resources for each of the control layer applications.

5. The programmable logic controller of claim 1, wherein the device memory includes volatile memory updated each processing scan cycle based on data associated with the output devices of the automation system, and the isolated app runtime environment comprises a discrete portion of the volatile memory.

6. The programmable logic controller of claim 1, wherein the isolated app runtime environment restricts network access for a respective control layer application to communication with the plurality of operator devices.

7. The programmable logic controller of claim 1, further comprising:

a real-time scheduler configured to schedule processing of the one or more control layer applications to facilitate real-time or near real-time execution on the processor.

8. The programmable logic controller of claim 1, further comprising:
a peer device interface configured to:
transmit first data associated with the one or more control layer applications to a first external control layer automation device, and
receive second data associated with one or more external control layer applications from a second external control layer automation device.

9. The programmable logic controller device of claim 1, wherein the control layer applications comprise a diagnostic application configured to detect a fault occurring in the automation system via inputs received from one or more field devices, wherein in response to the controller detecting a fault, determining that a maintenance notification needs to be sent, and recognizing that maintenance notification functionality is unavailable, the controller autonomously identifies a maintenance scheduler application, requests a download of the maintenance scheduler application from the marketplace server via the marketplace client, and installs the maintenance scheduler application.

10. A method for managing control layer applications, the method comprising:
maintaining, by a programmable logic controller, an isolated app runtime environment sandboxed from a general programmable logic controller runtime environment;
executing, by the programmable logic controller, a plurality of control layer applications in the isolated app runtime environment, each control layer application configured to perform a discrete set of automation functions;
scheduling, by the programmable logic controller, processing of the plurality of control layer applications to facilitate real-time or near real-time execution on a processor associated with the programmable logic controller;
in response to a detected fault, autonomously identifying, by a control layer application manager of the programmable logic controller, a needed functionality that is not available in the one or more control layer applications, the functionality including at least one of administration, maintenance, or monitoring by the programmable logic controller; and
autonomously identifying and retrieving a new control layer application from the marketplace server via the marketplace client that provides the needed functionality.

11. The method of claim 10, further comprising:
receiving, by the programmable logic controller, a request to modify one or more device settings associated with a first control layer application included in the plurality of control layer applications; and
modifying, by the programmable logic controller the one or more device settings based on the request.

12. The method of claim 10, further comprising:
receiving, by a wireless interface of the programmable logic controller, a request from an external operator device for functionality that is not available in the plurality of control layer applications;
retrieving, by the programmable logic controller, the new control layer application from the marketplace server via the marketplace client in response to the received request.

13. The method of claim 12, further comprising:
facilitating, by the programmable logic controller, a transaction with the marketplace server for payment of the new control layer application.

* * * * *